US012621834B2

(12) United States Patent (10) Patent No.: US 12,621,834 B2
Lin (45) Date of Patent: May 5, 2026

(54) APPARATUS AND METHOD OF WIRELESS COMMUNICATION

(71) Applicant: GUANGDONG OPPO MOBILE TELECOMMUNICATIONS CORP., LTD., Dongguan (CN)

(72) Inventor: Hao Lin, Neuilly-sur-Seine (FR)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 276 days.

(21) Appl. No.: 18/211,975

(22) Filed: Jun. 20, 2023

(65) Prior Publication Data

US 2023/0354342 A1 Nov. 2, 2023

Related U.S. Application Data

(63) Continuation of application No. PCT/IB2021/000077, filed on Jan. 15, 2021.

(51) Int. Cl.
*H04W 72/21* (2023.01)
*H04W 72/0453* (2023.01)

(52) U.S. Cl.
CPC ....... *H04W 72/21* (2023.01); *H04W 72/0453* (2013.01)

(58) Field of Classification Search
CPC . H04W 72/21; H04W 72/0453; H04W 16/14; H04W 72/53; H04L 5/0091; H04L 5/0053; H04L 5/0094; H04L 5/0064; H04L 5/0007; H04L 5/0041
See application file for complete search history.

(56) References Cited

U.S. PATENT DOCUMENTS

| | | | | |
|---|---|---|---|---|
| 11,553,509 | B2 * | 1/2023 | Kuo | H04L 5/001 |
| 11,799,609 | B2 * | 10/2023 | Myung | H04L 5/0094 |
| 12,074,823 | B2 * | 8/2024 | Myung | H04L 5/0053 |
| 12,156,217 | B2 * | 11/2024 | Baldemair | H04L 1/1819 |
| 12,200,712 | B2 * | 1/2025 | Li | H04L 5/0094 |
| 12,356,212 | B2 * | 7/2025 | Jang | H04W 72/23 |
| 2021/0391955 | A1 * | 12/2021 | He | H04L 5/0053 |
| 2022/0295452 | A1 * | 9/2022 | Tsai | H04L 5/0094 |

(Continued)

OTHER PUBLICATIONS

Intel Corporation, "UL signals and channels for NR-unlicensed ",3GPP Draft; R1-1913296, 3rd Generation Partnership Project (3GPP), Mobile Competence Centre ; 650, Route Des Lucioles ; F-06921 Sophia-Antipolis Cedex; France1-245 vol. RAN WGI, No. Reno, USA; Nov. 18, 2019-Nov. 22, 2019 Nov. 19, 2019 (Nov. 19, 2019), XP051826633.

(Continued)

*Primary Examiner* — Brian T O Connor
(74) *Attorney, Agent, or Firm* — BAYES PLLC

(57) ABSTRACT

An apparatus and a method of wireless communication are provided. The method by a user equipment (UE) includes determining, by the UE from a base station, a configuration of a physical uplink control channel (PUCCH) resource, wherein the PUCCH resource in frequency domain comprises one or more physical resource blocks (PRBs) and corresponds to a PUCCH format 0, a PUCCH format 1, or a PUCCH format 4. This can solve issues in the prior art, provide a method to boost a transmission power of PUCCH, provide a good communication performance, and/or provide high reliability.

19 Claims, 5 Drawing Sheets

(56) References Cited

U.S. PATENT DOCUMENTS

| | | | | |
|---|---|---|---|---|
| 2022/0353698 | A1* | 11/2022 | Jang | H04L 1/189 |
| 2023/0403715 | A1* | 12/2023 | Yuan | H04L 1/1896 |
| 2025/0106854 | A1* | 3/2025 | Yi | H04L 5/0012 |

OTHER PUBLICATIONS

LG Electronics: "Physical layer design of UL signals and channels for NR-U". 3GPP Draft; R1-1910818, 3rd Generation Partnership Project (3GPP), Mobile Competence Centre; 650, Route Deslucioles; F-06921 Sophia-Antipolis Cedex ; Francevol. RAN WG1, No. Chongqing, China;Oct. 14, 2019-Oct. 18, 2019 Oct. 8, 2019 (Oct. 8, 2019), XP051809208. Retrieved from the Internet; URL:https://ftp.3gpp.org/tsg ran/WG1 RL1/TSGR1_98b/Docs/R1-1910818.zipR1-1910818.docx[retrieved on Oct. 8, 2019].

3rd Generation Partnership Project; Technical Specification Group Radio Access Network; "Study on supporting NR from 52.6 GHz to 71 GHz (Release 17)", 3GPP TR 38.808 V0.2.0 (Nov. 2020).

International Search Report in the international application No. PCT/IB2021/000077, mailed on Oct. 18, 2021.

Written Opinion of the International Search Authority in the international application No. PCT/IB2021/000077, mailed on Oct. 18, 2021.

First Office Action of the European application No. 21717505.8, issued on Sep. 25, 2025.

* cited by examiner

30

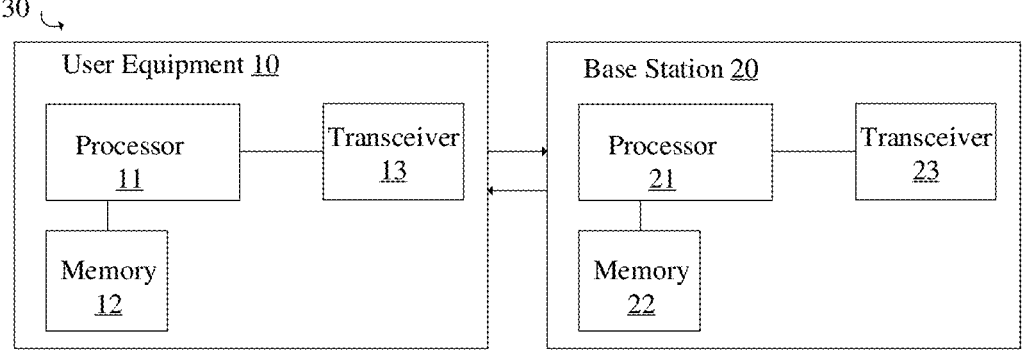

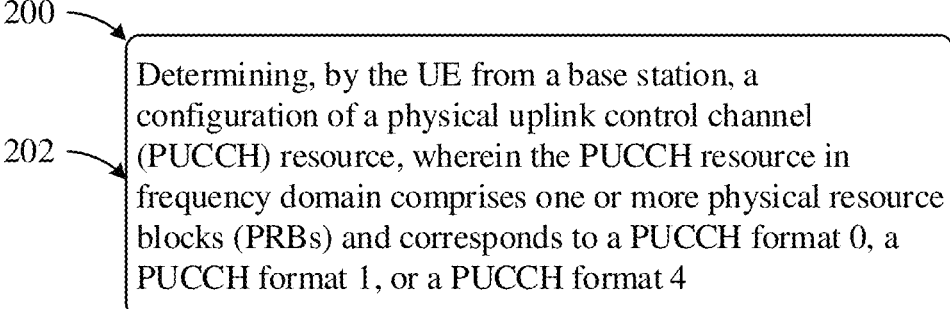

202

Determining, by the UE from a base station, a configuration of a physical uplink control channel (PUCCH) resource, wherein the PUCCH resource in frequency domain comprises one or more physical resource blocks (PRBs) and corresponds to a PUCCH format 0, a PUCCH format 1, or a PUCCH format 4

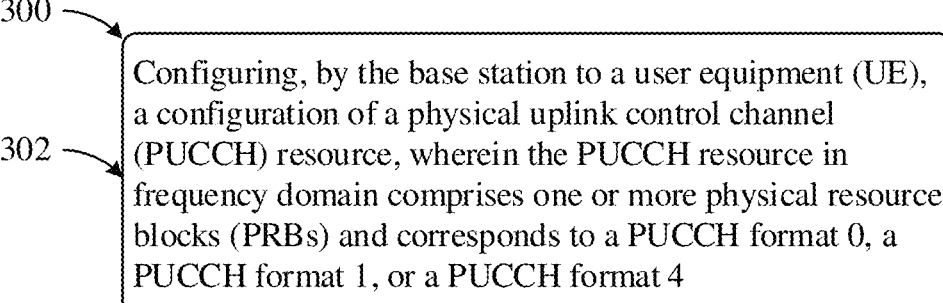

302

Configuring, by the base station to a user equipment (UE), a configuration of a physical uplink control channel (PUCCH) resource, wherein the PUCCH resource in frequency domain comprises one or more physical resource blocks (PRBs) and corresponds to a PUCCH format 0, a PUCCH format 1, or a PUCCH format 4

FIG. 3

BWP
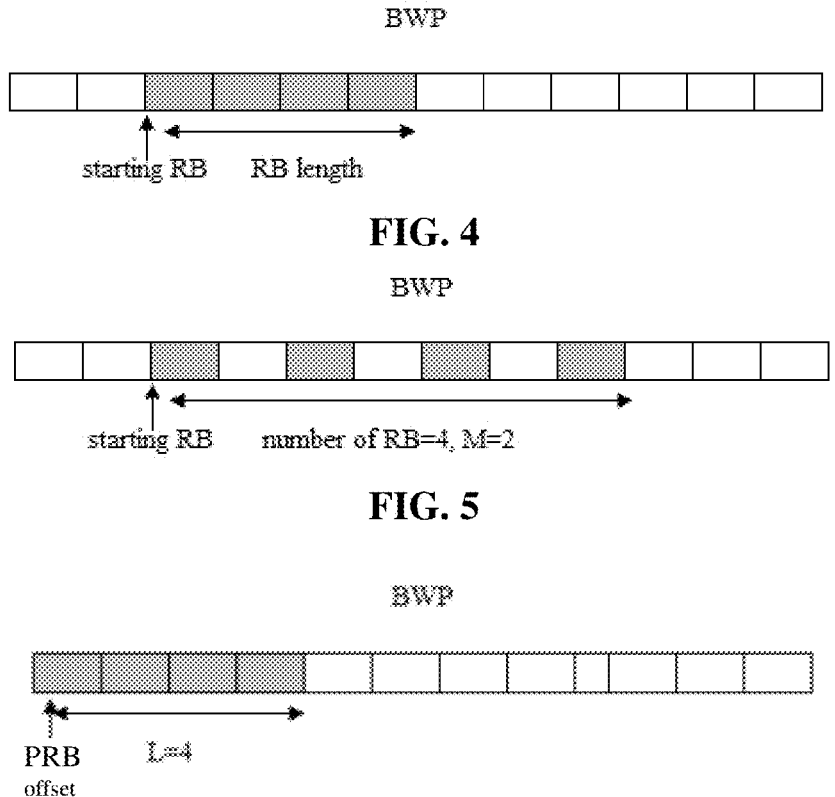
FIG. 4
FIG. 5
FIG. 6
BWP
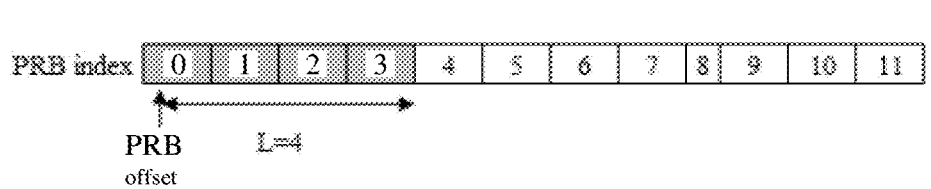
FIG. 7

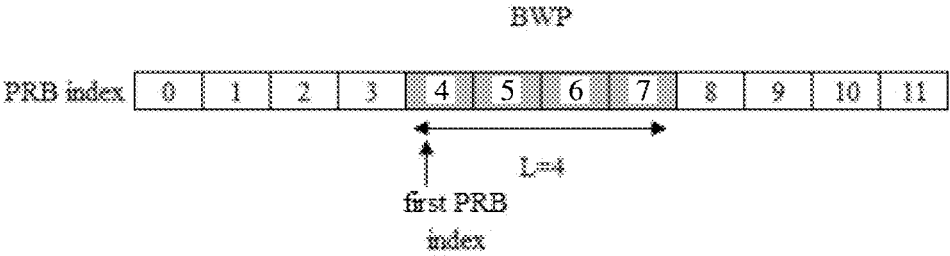
FIG. 8
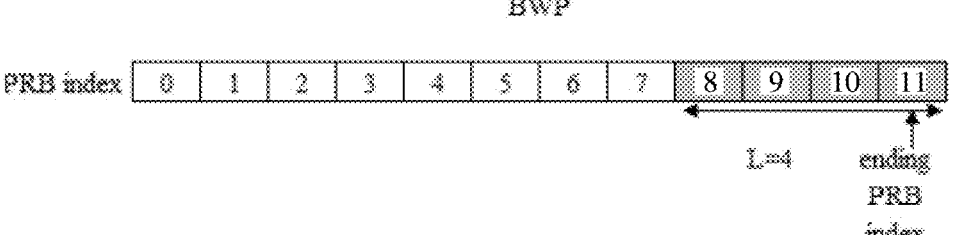
FIG. 9
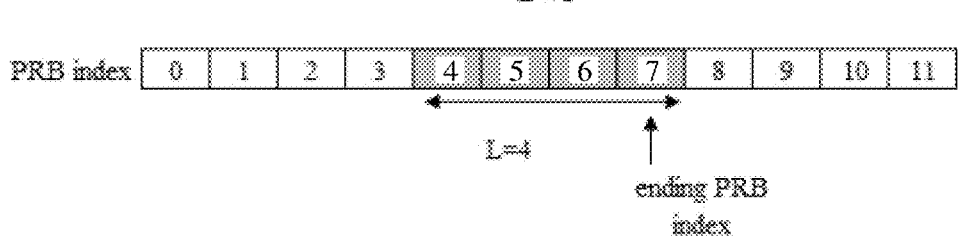
FIG. 10
FIG. 11

700

APPARATUS AND METHOD OF WIRELESS COMMUNICATION

CROSS-REFERENCE TO RELATED APPLICATION

This is a continuation of International Application No. PCT/IB2021/000077 filed on Jan. 15, 2021, which is incorporated herein by reference in its entirety.

TECHNICAL FIELD

The present disclosure relates to the field of communication systems, and more particularly, to an apparatus and a method of wireless communication, which can provide a good communication performance and/or high reliability.

BACKGROUND

An unlicensed spectrum is a shared spectrum. A communication device in different communication systems can use the unlicensed spectrum as long as the communication device meets regulatory requirements set by the country or region on the unlicensed spectrum and does not need to apply for a proprietary spectrum authorization from the government.

In order to allow various communication systems that use the unlicensed spectrum for wireless communication to coexist friendly in the unlicensed spectrum, some countries or regions specify regulatory requirements that must be met to use the unlicensed spectrum. For example, the communication device follows the principle of "a channel access procedure (or called a listen before talk (LBT) procedure", that is, the communication device needs to perform channel sensing before transmitting a signal on the channel Only when the LBT outcome shows that the channel is idle, the communication device can perform signal transmission, or otherwise, the communication device cannot perform the signal transmission. In order to ensure fairness, once the communication device successfully occupies the channel, a transmission duration cannot exceed the maximum channel occupancy time (MCOT). The LBT mechanism is also called channel access procedure. In a new radio (NR) release 16 (R16), there are different types of channel access procedures, e.g. type 1, type 2A, type 2B, and type 2C channel access procedures as described in a third generation partnership project (3GPP) technical specification (TS) 37.213.

In new radio (NR) Release 15 and Release 16 systems, an operation frequency range is limited to below 52.6 GHz. To further boost a data throughput, future network can further envision using a higher frequency range, e.g. above 52.6 GHz, e.g. 60 GHz, is a shared spectrum. Moreover, the power spectrum density is limited in this frequency band. In this case, the PUCCH transmission robustness or coverage will be limited accordingly.

Therefore, there is a need for an apparatus (such as a user equipment (UE) and/or a base station) and a method of wireless communication, which can solve issues in the prior art, provide a method to boost a transmission power of PUCCH, provide a good communication performance, and/or provide high reliability.

SUMMARY

An object of the present disclosure is to propose an apparatus (such as a user equipment (UE) and/or a base station) and a method of wireless communication, which can solve issues in the prior art, provide a method to boost a transmission power of PUCCH, provide a good communication performance, and/or provide high reliability.

In a first aspect of the present disclosure, a method of wireless communication by a user equipment (UE) comprises determining, by the UE from a base station, a configuration of a physical uplink control channel (PUCCH) resource, wherein the PUCCH resource in frequency domain comprises one or more physical resource blocks (PRBs) and corresponds to a PUCCH format 0, a PUCCH format 1, or a PUCCH format 4.

In a second aspect of the present disclosure, a method of wireless communication by a base station comprises configuring, by the base station to a user equipment (UE), a configuration of a physical uplink control channel (PUCCH) resource, wherein the PUCCH resource in frequency domain comprises one or more physical resource blocks (PRBs) and corresponds to a PUCCH format 0, a PUCCH format 1, or a PUCCH format 4.

In a third aspect of the present disclosure, a user equipment comprises a memory, a transceiver, and a processor coupled to the memory and the transceiver. The processor is configured to determine from a base station, a configuration of a physical uplink control channel (PUCCH) resource, wherein the PUCCH resource in frequency domain comprises one or more physical resource blocks (PRBs) and corresponds to a PUCCH format 0, a PUCCH format 1, or a PUCCH format 4.

In a fourth aspect of the present disclosure, a base station comprises a memory, a transceiver, and a processor coupled to the memory and the transceiver. The processor is configured to configure to a user equipment (UE), a configuration of a physical uplink control channel (PUCCH) resource, wherein the PUCCH resource in frequency domain comprises one or more physical resource blocks (PRBs) and corresponds to a PUCCH format 0, a PUCCH format 1, or a PUCCH format 4.

In a fifth aspect of the present disclosure, a non-transitory machine-readable storage medium has stored thereon instructions that, when executed by a computer, cause the computer to perform the above method.

In a sixth aspect of the present disclosure, a chip includes a processor, configured to call and run a computer program stored in a memory, to cause a device in which the chip is installed to execute the above method.

In a seventh aspect of the present disclosure, a computer readable storage medium, in which a computer program is stored, causes a computer to execute the above method.

In an eighth aspect of the present disclosure, a computer program product includes a computer program, and the computer program causes a computer to execute the above method.

In a ninth aspect of the present disclosure, a computer program causes a computer to execute the above method.

BRIEF DESCRIPTION OF THE DRAWINGS

In order to more clearly illustrate the embodiments of the present disclosure or related art, the following figures will be described in the embodiments are briefly introduced. It is obvious that the drawings are merely some embodiments of the present disclosure, a person having ordinary skill in this field can obtain other figures according to these figures without paying the premise.

FIG. 1 is a block diagram of one or more user equipments (UEs) and a base station (e.g., gNB or eNB) of communication in a communication network system according to an embodiment of the present disclosure.

FIG. 2 is a flowchart illustrating a method of wireless communication by a user equipment (UE) according to an embodiment of the present disclosure.

FIG. 3 is a flowchart illustrating a method of wireless communication by a base station according to an embodiment of the present disclosure.

FIG. 4 is a schematic diagram illustrating that one or more physical resource blocks (PRBs) are consecutive in frequency domain according to an embodiment of the present disclosure.

FIG. 5 is a schematic diagram illustrating that between two physical uplink control channel (PUCCH) RBs, there is one RB interval according to an embodiment of the present disclosure.

FIG. 6 is a schematic diagram illustrating that when a PRB offset is equal to 0 and a number of PRBs is equal to 4, a PUCCH resource is determined according to an embodiment of the present disclosure.

FIG. 7 is a schematic diagram illustrating that when a PRB offset is equal to 0, L is equal to 4, $r_{PUCCH}=0$, and $N_{CS}=2$, a PUCCH resource in frequency domain is determined according to an embodiment of the present disclosure.

FIG. 8 is a schematic diagram illustrating that when a PRB offset is equal to 0, L is equal to 4, $r_{PUCCH}=2$, and $N_{CS}=2$, a PUCCH resource in frequency domain is determined according to an embodiment of the present disclosure.

FIG. 9 is a schematic diagram illustrating that when N=12, a PRB offset is equal to 0, L is equal to 4, $r_{PUCCH}=0$, and $N_{CS}=2$, a PUCCH resource in frequency domain is determined according to an embodiment of the present disclosure.

FIG. 10 is a schematic diagram illustrating that when N=12, a PRB offset is equal to 0, L is equal to 4, $r_{PUCCH}=2$, and $N_{CS}=2$, a PUCCH resource in frequency domain is determined according to an embodiment of the present disclosure.

FIG. 11 is a schematic diagram illustrating a PUCCH resource comprising non-consecutive PRBs in frequency domain according to an embodiment of the present disclosure.

DETAILED DESCRIPTION

Figure 12:
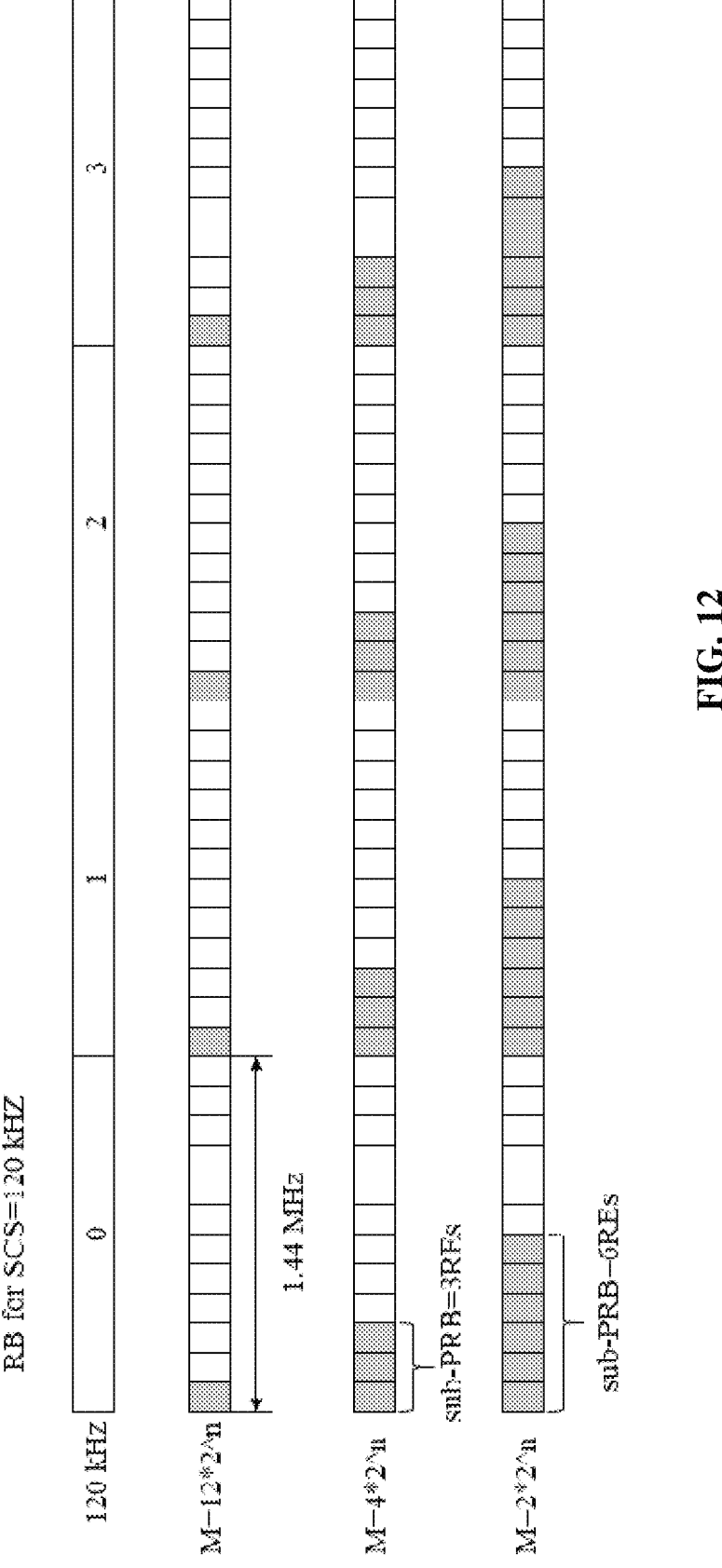
FIG. 12 is a schematic diagram illustrating a sub-PRB allocation according to an embodiment of the present disclosure.

Embodiments of the present disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the disclosure.

FIG. 1 illustrates that, in some embodiments, one or more user equipments (UEs) 10 and a base station (e.g., gNB or eNB) 20 for transmission adjustment in a communication network system 30 according to an embodiment of the present disclosure are provided. The communication network system 30 includes the one or more UEs 10 and the base station 20. The one or more UEs 10 may include a memory 12, a transceiver 13, and a processor 11 coupled to the memory 12 and the transceiver 13. The base station 20 may include a memory 22, a transceiver 23, and a processor 21 coupled to the memory 22 and the transceiver 23. The processor 11 or 21 may be configured to implement proposed functions, procedures and/or methods described in this description. Layers of radio interface protocol may be implemented in the processor 11 or 21. The memory 12 or 22 is operatively coupled with the processor 11 or 21 and stores a variety of information to operate the processor 11 or 21. The transceiver 13 or 23 is operatively coupled with the processor 11 or 21, and the transceiver 13 or 23 transmits and/or receives a radio signal.

The processor 11 or 21 may include application-specific integrated circuit (ASIC), other chipset, logic circuit and/or data processing device. The memory 12 or 22 may include read-only memory (ROM), random access memory (RAM), flash memory, memory card, storage medium and/or other storage device. The transceiver 13 or 23 may include base-band circuitry to process radio frequency signals. When the embodiments are implemented in software, the techniques described herein can be implemented with modules (e.g., procedures, functions, and so on) that perform the functions described herein. The modules can be stored in the memory 12 or 22 and executed by the processor 11 or 21. The memory 12 or 22 can be implemented within the processor 11 or 21 or external to the processor 11 or 21 in which case those can be communicatively coupled to the processor 11 or 21 via various means as is known in the art.

In some embodiments, the processor 11 is configured to determine from a base station, a configuration of a physical uplink control channel (PUCCH) resource, wherein the PUCCH resource in frequency domain comprises one or more physical resource blocks (PRBs) and corresponds to a PUCCH format 0, a PUCCH format 1, or a PUCCH format 4. This can solve issues in the prior art, provide a method to boost a transmission power of PUCCH, provide a good communication performance, and/or provide high reliability.

In some embodiments, the processor 21 is configured to configure to a user equipment (UE), a configuration of a physical uplink control channel (PUCCH) resource, wherein the PUCCH resource in frequency domain comprises one or more physical resource blocks (PRBs) and corresponds to a PUCCH format 0, a PUCCH format 1, or a PUCCH format 4. This can solve issues in the prior art, provide a method to boost a transmission power of PUCCH, provide a good communication performance, and/or provide high reliability.

FIG. 2 illustrates a method 200 of wireless communication by a user equipment (UE) 10 according to an embodiment of the present disclosure. In some embodiments, the method 200 includes: a block 202, determining, by the UE from a base station, a configuration of a physical uplink control channel (PUCCH) resource, wherein the PUCCH resource in frequency domain comprises one or more physical resource blocks (PRBs) and corresponds to a PUCCH format 0, a PUCCH format 1, or a PUCCH format 4. This can solve issues in the prior art, provide a method to boost a transmission power of PUCCH, provide a good communication performance, and/or provide high reliability.

FIG. 3 illustrates a method 300 of wireless communication by a base station 20 according to an embodiment of the present disclosure. In some embodiments, the method 300 includes: a block 302, configuring, by the base station to a user equipment (UE), a configuration of a physical uplink control channel (PUCCH) resource, wherein the PUCCH resource in frequency domain comprises one or more physical resource blocks (PRBs) and corresponds to a PUCCH format 0, a PUCCH format 1, or a PUCCH format 4. This can solve issues in the prior art, provide a method to boost a transmission power of PUCCH, provide a good communication performance, and/or provide high reliability.

In some embodiments, the PRBs are consecutive in the frequency domain. In some embodiments, the configuration of the PUCCH resource comprises a starting RB and/or a number of RBs used as an RB length. In some embodiments, the configuration of the PUCCH resource comprises at least one of the followings: a PUCCH starting PRB index, a number of PRBs for PUCCH (L), or a PUCCH format. In some embodiments, the PUCCH starting PRB index, the number of PRBs for PUCCH, and the PUCCH format are pre-defined in a configuration table. In some embodiments, the UE is configured to receive the configuration of the PUCCH resource in system information. In some embodiments, columns of the configuration table configure the PUCCH format, a first symbol, a number of symbols, a PRB offset, the number of PRBs, and a set of initial CS index. In some embodiments, the PUCCH starting PRB index and the PUCCH format are defined in a configuration table. In some embodiments, columns of the configuration table configure the PUCCH format, a first symbol, a number of symbols, a PRB offset, and a set of initial CS index. In some embodiments, the configuration table and the number of PRBs for PUCCH are separately configured in system information.

In some embodiments, the PRB offset and/or the number of PRBs are used to determine the PUCCH resource in the frequency domain. In some embodiments, the configuration table is pre-defined. In some embodiments, the configuration table comprises 16 rows configuring a PUCCH resource set, and the PUCCH resource set comprises sixteen PUCCH resources corresponding to PUCCH resource indexes from 0 to 15. In some embodiments, the PUCCH starting PRB index is obtained from a PUCCH resource index ($r_{PUCCH}$) In some embodiments, the PUCCH resource index ($r_{PUCCH}$) is ranged from 0 to 15. In some embodiments, a PUCCH resource in frequency domain comprises L consecutive PRBs starting from the PUCCH starting PRB index. In some embodiments, a first PUCCH resource corresponding to a first PUCCH resource index is not overlapped in frequency domain with a second PUCCH resource corresponding to a second PUCCH resource index. In some embodiments, the first PUCCH resource and the second PUCCH resource are adjacent in frequency domain, where the second PUCCH resource index is equal to the first PUCCH resource index plus Ncs, wherein the Ncs is the number of the cyclic shift indexes in the set of initial cyclic shift indexes.

In some embodiments, for consecutive PRBs in the frequency domain, the PUCCH starting PRB index for PUCCH resource in the frequency domain is determined by at least one of the following: the PRB offset, the number of PRBs for PUCCH, the PUCCH resource index ($r_{PUCCH}$) and $N_{CS}$, wherein $N_{CS}$ is the number of initial cyclic shift indexes in the set of initial cyclic shift indexes. In some embodiments, for consecutive PRBs in the frequency domain, the PUCCH starting PRB index for PUCCH resource in the frequency domain is determined by PRB offset+L*$[r_{PUCCH}/N_{CS}]$, where $r_{PUCCH}$ is the PUCCH resource index, $N_{CS}$ is the total number of initial cyclic shift indexes in the set of initial cyclic shift indexes, and L is the number of PRBs for PUCCH. In some embodiments, a PUCCH resource determination follows a frequency hopping allocating the PUCCH resource backwards from an ending PRB of a bandwidth part (BWP). In some embodiments, for consecutive PRBs in the frequency domain, a last PRB index of the PUCCH resource is determined by N−1−PRB offset−L*

$[r_{PUCCH}/N_{CS}]$, where N−1 is the last PRB index of the BWP, $r_{PUCCH}$ is the PUCCH resource index, $N_{CS}$ is the total number of initial cyclic shift indexes in the set of initial cyclic shift indexes, and L is the number of PRBs for PUCCH. In some embodiments, the PRBs are non-consecutive in the frequency domain In some embodiments, for non-consecutive PRBs in the frequency domain, the configuration of the PUCCH resource comprises a starting RB, a number of RBs used as an RB length, and an RB interval between two RBs.

In some embodiments, the configuration of the PUCCH resource comprises at least one of the followings: a PUCCH starting PRB index, a number of PRBs for PUCCH, a PUCCH format, or a PRB interval. In some embodiments, the PUCCH starting PRB index, the number of PRBs for PUCCH, the PRB interval, and the PUCCH format are pre-defined in a configuration table. In some embodiments, the UE is configured to receive the configuration of the PUCCH resource in system information. In some embodiments, columns of the configuration table configure the PUCCH format, a first symbol, a number of symbols, a PRB offset, the number of PRBs, the PRB interval, and a set of initial CS index. In some embodiments, the PUCCH starting PRB index and the PUCCH format are pre-defined in a configuration table. In some embodiments, columns of the configuration table configure the PUCCH format, a first symbol, a number of symbols, a PRB offset, and a set of initial CS index. In some embodiments, the configuration table, the number of PRBs for PUCCH, and the PRB interval are separately configured in system information. In some embodiments, the PRB offset and/or the number of PRBs are used to determine the PUCCH resource in the frequency domain. In some embodiments, the configuration table is pre-defined.

In some embodiments, the configuration table comprises 16 rows configuring a PUCCH resource set, and the PUCCH resource set comprises sixteen PUCCH resources corresponding to PUCCH resource indexes from 0 to 15. In some embodiments, for non-consecutive PRBs in the frequency domain, the PUCCH starting PRB index for PUCCH resource in the frequency domain is determined by at least one of the following: the PRB offset, the number of PRBs for PUCCH, the PUCCH resource index ($r_{PUCCH}$) and $N_{CS}$, wherein $N_{CS}$ is the number of initial cyclic shift indexes in the set of initial cyclic shift indexes. In some embodiments, for non-consecutive PRBs in the frequency domain, the PUCCH starting PRB index for PUCCH resource in the frequency domain is determined by PRB offset+L+(L−1) *M*$[r_{PUCCH}/N_{CS}]$, where $r_{PUCCH}$ is the PUCCH resource index, $N_{CS}$ is the total number of initial cyclic shift indexes in the set of initial cyclic shift indexes, L is the number of PRBs for PUCCH, and M is the PRB interval. In some embodiments, a PUCCH resource determination follows a frequency hopping allocating the PUCCH resource backwards from an ending PRB of a bandwidth part (BWP). In some embodiments, for consecutive PRBs in the frequency domain, a last PRB index of the PUCCH resource is determined by N−1−PRB offset−L+(L−1)*M*$[r_{PUCCH}/N_{CS}]$, where N−1 is the last PRB index of the BWP, $r_{PUCCH}$ is the PUCCH resource index, $N_{CS}$ is the total number of initial cyclic shift indexes in the set of initial cyclic shift indexes, L is the number of PRBs for PUCCH, and M is the PRB interval. In some embodiments, a first PUCCH index and a second PUCCH index respectively correspond to a first PUCCH resource and a second PUCCH resource.

In some embodiments, a first PRB index of the first PUCCH resource and a second PRB index of the second PUCCH resource are not overlapped in the frequency domain. In some embodiments, the first PRB index of the first PUCCH resource and the second PRB index of the second PUCCH resource are adjacent in the frequency domain. In some embodiments, the second PRB index is a first PRB, and the first PRB index is a last PRB. In some embodiments, the second PUCCH index is equal to first PUCCH index plus $N_{CS}$, where $N_{CS}$ is the total number of initial cyclic shift indexes in the set of initial cyclic shift indexes. In some embodiments, when the UE is in a radio resource control (RRC) connection state, the UE determines the PUCCH resource from the base station in an RRC message. In some embodiments, the PUCCH starting PRB index and/or the number of PRBs and/or the PRB interval are configured in PUCCH-resource information element (IE).

In some embodiments, one PRB comprises 12 resource elements (Res), and the partial PRB or the sub-PRB comprises one or more REs smaller than 12 REs. In some embodiments, the number of REs in the partial PRB or the sub-PRB is divisible by 12. In some embodiments, the number of REs in the partial PRB or the sub-PRB comprises 1, 2, 3, 4, or 6. In some embodiments, for the UE to determine the PUCCH resource, the UE is configured to determine the one or more PRBs in which the PUCCH resource is allocated. In some embodiments, after the UE determines the one or more PRBs in which the PUCCH resource is allocated, the UE further determines the partial PRB or the sub-PRB within in the one or more PRBs that are allocated for PUCCH resource. In some embodiments, the number of the REs in the partial PRB or the sub-PRB, and/or a location of the partial PRB or the sub-PRB within the PRB can be pre-configured or pre-defined. In some embodiments, there is an interval between two allocated partial PRBs or sub-PRBs. In some embodiments, the interval between the two allocated partial PRBs or sub-PRBs is pre-configured or pre-defined.

In some embodiments, the interval between the two allocated partial PRBs or sub-PRBs comprises a number of partial PRBs or sub-PRBs. In some embodiments, value of M is calculated by A times 2 to the power of n, where M is the interval between the two allocated partial PRBs or sub-PRBs, A is equal to 12 divided by B, B is a number of the REs in the partial PRB or the sub-PRB, and n is an integer. In some embodiments, n is equal to 0 or equal to or greater than 1. In some embodiments, M means between the two allocated partial PRBs or sub-PRBs, there are M empty sub-PRBs therebetween that are not allocated for PUCCH resource. In some embodiments, the PUCCH resource allocation is based on a full PRB-based allocation. In some embodiments, the PUCCH resource allocation is based on a sub-PRB-based allocation. In some embodiments, the PUCCH resource allocation is not based on a full PRB-based allocation, and the sub-PRB is allocated for PUCCH.

In some embodiments, in a frequency range above 52.6 GHz and in some regions, the operation is in a shared spectrum. Moreover, the power spectrum density is limited in this frequency band. Consequently, for PUCCH transmission with format 0 or format 1 or format 4 of new radio (NR), due to the limited PUCCH resource, i.e. 1 PRB in frequency domain, the transmit power is also limited, which is less than the UE supported maximum transmit power. This will limit the PUCCH coverage. In order to resolve this issue. Some embodiments propose that the PUCCH resource in frequency domain can be increased to more than one PRB. More detailed illustration as well as the configurations are presented as follows.

FIG. 4 illustrates that one or more physical resource blocks (PRBs) are consecutive in frequency domain according to an embodiment of the present disclosure. In some examples, the PUCCH format 0 or format 1 or format 4 contains one or more physical resource blocks (PRBs). In some examples, the one or more PRBs are consecutive in frequency domain as illustrated in FIG. 4. For configuration of the PUCCH frequency resource, a gNB can configure a starting RB and a number of RBs as the length, e.g. starting RB=2, RB length=4 RBs as illustrated in FIG. 4.

FIG. 5 illustrates that between two physical uplink control channel (PUCCH) RBs, there is one RB interval according to an embodiment of the present disclosure. In some examples, the one or more PRBs are non-consecutive in frequency domain as illustrated in FIG. 5. Compared to example of FIG. 4, in this example, the configuration of PUCCH resource in frequency domain comprises a starting RB, a RB length (or a number of RB) used for PUCCH resource. Moreover, there is another parameter which is used to determine a number of RBs between the two PUCCH RBs as illustrated in FIG. 5, where between two PUCCH RBs, there is one RB interval. This example denotes M as the number of RBs as the RB interval, i.e. M RBs between two PUCCH RBs. In an example of FIG. 5, the value of M=1.

FIG. 6 illustrates that when a PRB offset is equal to 0 and a number of PRBs is equal to 4, a PUCCH resource is determined according to an embodiment of the present disclosure. For consecutive PRB PUCCH resource allocation, the gNB needs to indicate at least one of the followings: a PUCCH starting PRB index, a number of PRB for PUCCH, or a PUCCH format. In initial access phase, the three parameters may be configured jointly in a same configuration table or pre-defined in the PUCCH resource configuration. For example, the network or gNB may configure the UE to use a given PUCCH configuration. The configuration is transmitted in system information. More specifically, there is pre-defined PUCCH configuration table, and this example assumes the PUCCH resource contains L consecutive PRBs in frequency domain In table 1 of PUCCH configuration, it contains a set of rows and a set of columns. In some embodiments, L is a positive integer and is greater than or equal to 1. For example, L is equal to 1, 2, or 4.

TABLE 1

| | | | | | | |
|---|---|---|---|---|---|---|
| | | | | PUCCH resource sets | | |
| Index | PUCCH format | First symbol | Number of symbols | PRB offset $RB_{BWP}^{offset}$ | Number of PRB (L) | Set of initial CS indexes |
| 0 | 0 | 12 | 2 | 0 | Positive integer | {0, 3} |
| 1 | 0 | 12 | 2 | 0 | Positive integer | {0, 4, 8} |

TABLE 1-continued

| | | | | | | Set of |
|---|---|---|---|---|---|---|
| Index | PUCCH format | First symbol | Number of symbols | PRB offset $RB_{BWP}^{offset}$ | Number of PRB (L) | initial CS indexes |
| 2 | 0 | 12 | 2 | 3 | Positive integer | {0, 4, 8} |
| 3 | 1 | 10 | 4 | 0 | Positive integer | {0, 6} |
| 4 | 1 | 10 | 4 | 0 | Positive integer | {0, 3, 6, 9} |
| 5 | 1 | 10 | 4 | 2 | Positive integer | {0, 3, 6, 9} |
| 6 | 1 | 10 | 4 | 4 | Positive integer | {0, 3, 6, 9} |
| 7 | 1 | 4 | 10 | 0 | Positive integer | {0, 6} |
| 8 | 1 | 4 | 10 | 0 | Positive integer | {0, 3, 6, 9} |
| 9 | 1 | 4 | 10 | 2 | Positive integer | {0, 3, 6, 9} |
| 10 | 1 | 4 | 10 | 4 | Positive integer | {0, 3, 6, 9} |
| 11 | 1 | 0 | 14 | 0 | Positive integer | {0, 6} |
| 12 | 1 | 0 | 14 | 0 | Positive integer | {0, 3, 6, 9} |
| 13 | 1 | 0 | 14 | 2 | Positive integer | {0, 3, 6, 9} |
| 14 | 1 | 0 | 14 | 4 | Positive integer | {0, 3, 6, 9} |
| 15 | 1 | 0 | 14 | $\lfloor N_{BWP}^{size}/4 \rfloor$ | Positive integer | {0, 3, 6, 9} |

The columns of the table 1 configure a set of parameters including PUCCH format, first symbol, number of symbols, PRB offset, number of PRBs, set of initial CS index. One example is given in table 1, where PRB offset and number of PRBs are two parameters to determine the PUCCH resource in frequency domain. PRB offset is equivalent to starting RB and the number of PRB is identical to the RB length. Thus, when PRB offset=0 and number of PRB=4, this example can determine the PUCCH resource as FIG. 6. Note that, each row of the table pre-defines a set of PUCCH resource parameters and there are 16 rows and the gNB can indicate the row index for the UE to determine the PUCCH resource. This example indicates these parameters (PRB offset and number of PRB) together, therefore signal overhead can be reduced.

Optionally, the parameters (PRB offset and number of PRB) may be separately configured. For example, the PUCCH configuration table as illustrated in table 2 does not contain parameter L (number of PRB for PUCCH). Instead, the value of L is separately configured in the system information. This example indicates these parameters separately, making the use of parameters (PRB offset and number of PRB) flexible.

TABLE 2

| | | | | PRB | Set of |
|---|---|---|---|---|---|
| Index | PUCCH format | First symbol | Number of symbols | offset $RB_{BWP}^{offset}$ | initial CS indexes |
| 0 | 0 | 12 | 2 | 0 | {0, 3} |
| 1 | 0 | 12 | 2 | 0 | {0, 4, 8} |
| 2 | 0 | 12 | 2 | 3 | {0, 4, 8} |
| 3 | 1 | 10 | 4 | 0 | {0, 6} |
| 4 | 1 | 10 | 4 | 0 | {0, 3, 6, 9} |

TABLE 2-continued

PUCCH resource sets

| | | | | PRB | Set of |
|---|---|---|---|---|---|
| Index | PUCCH format | First symbol | Number of symbols | offset $RB_{BWP}^{offset}$ | initial CS indexes |
| 5 | 1 | 10 | 4 | 2 | {0, 3, 6, 9} |
| 6 | 1 | 10 | 4 | 4 | {0, 3, 6, 9} |
| 7 | 1 | 4 | 10 | 0 | {0, 6} |
| 8 | 1 | 4 | 10 | 0 | {0, 3, 6, 9} |
| 9 | 1 | 4 | 10 | 2 | {0, 3, 6, 9} |
| 10 | 1 | 4 | 10 | 4 | {0, 3, 6, 9} |
| 11 | 1 | 0 | 14 | 0 | {0, 6} |
| 12 | 1 | 0 | 14 | 0 | {0, 3, 6, 9} |
| 13 | 1 | 0 | 14 | 2 | {0, 3, 6, 9} |
| 14 | 1 | 0 | 14 | 4 | {0, 3, 6, 9} |
| 15 | 1 | 0 | 14 | $\lfloor N_{BWP}^{size}/4 \rfloor$ | {0, 3, 6, 9} |

FIG. 7 illustrates that when a PRB offset is equal to 0, L is equal to 4, $r_{PUCCH}$=0, and $N_{CS}$=2, a PUCCH resource in frequency domain is determined according to an embodiment of the present disclosure. In some embodiments, the PRB offset and/or the number of PRBs are used to determine the PUCCH resource in the frequency domain. In some embodiments, the configuration table is pre-defined. In some embodiments, the configuration table comprises 16 rows configuring a PUCCH resource set, and the PUCCH resource set comprises sixteen PUCCH resources corresponding to PUCCH resource indexes from 0 to 15. In some embodiments, the PUCCH starting PRB index is obtained from a PUCCH resource index (rPuccx) In some embodiments, the PUCCH resource index ($r_{PUCCH}$) is ranged from 0 to 15. In some embodiments, a PUCCH resource in frequency domain comprises L consecutive PRBs starting from the PUCCH starting PRB index. In some embodiments, a first PUCCH resource corresponding to a first PUCCH resource index is not overlapped in frequency domain with a second PUCCH resource corresponding to a second PUCCH resource index. In some embodiments, the first PUCCH resource and the second PUCCH resource are adjacent in frequency domain, where the second PUCCH resource index is equal to the first PUCCH resource index plus Ncs, wherein the Ncs is the number of the cyclic shift indexes in the set of initial cyclic shift indexes. In some embodiments, for consecutive PRBs in the frequency domain, the PUCCH starting PRB index for PUCCH resource in the frequency domain is determined by at least one of the following: the PRB offset, the number of PRBs for PUCCH, the PUCCH resource index ($r_{PUCCH}$) and $N_{CS}$, wherein $N_{CS}$ is the number of initial cyclic shift indexes in the set of initial cyclic shift indexes.

In some examples, the PUCCH resource in frequency domain determination is relevant to a PUCCH resource index, where the PUCCH resource index is ranged from 0 to 15, each value of the PUCCH resource index corresponds to a PUCCH resource in frequency domain, determined together with PRB offset and/or number of PRB (L). One example is that the starting PRB index for PUCCH resource in frequency domain is determined by PRB offset+L*$[r_{PUCCH}/N_{CS}]$, where $r_{PUCCH}$ is the PUCCH resource index, $N_{CS}$ is the total number of initial cyclic shift indexes in the set of initial cyclic shift indexes, L is the number of PRBs for the PUCCH, e.g. when PRB offset=0, L=4, $r_{PUCCH}$=0, $N_{CS}$=2 (according to the table row index=0), the PUCCH resource in frequency domain is illustrated in FIG. 7. This formula applies to consecutive PRBs in frequency domain.

FIG. 8 illustrates that when a PRB offset is equal to 0, L is equal to 4, $r_{PUCCH}$=2, and $N_{CS}$=2, a PUCCH resource in frequency domain is determined according to an embodiment of the present disclosure. In another example, when PRB offset=0, L=4, $r_{PUCCH}$=2, $N_{CS}$=2 (according to the table row index=0), the PUCCH resource in frequency domain is illustrated in FIG. 8.

FIG. 9 illustrates that when N=12, a PRB offset is equal to 0, L is equal to 4, $r_{PUCCH}$=0, and $N_{CS}$=2, a PUCCH resource in frequency domain is determined according to an embodiment of the present disclosure. In some examples, PUCCH resource determination follows a frequency hopping concept, which allocates the PUCCH resource backwards from the ending PRB of a given BWP, e.g. the last PRB index of a PUCCH resource is determined by N−1−PRB offset−L*$[r_{PUCCH}/N_{CS}]$, where N−1 is the last PRB index of a given BWP, e.g. when N=12, PRB offset=0, L=4, $r_{PUCCH}$=0, $N_{CS}$=2, the PUCCH resource in frequency domain is illustrated in FIG. 9. This formula applies to consecutive PRBs in frequency domain.

FIG. 10 illustrates that when N=12, a PRB offset is equal to 0, L is equal to 4, $r_{PUCCH}$=2, and $N_{CS}$=2, a PUCCH resource in frequency domain is determined according to an embodiment of the present disclosure. In another example, when N=12, PRB offset=0, L=4, $r_{PUCCH}$=2, $N_{CS}$=2, the PUCCH resource in frequency domain is illustrated in FIG. 10.

FIG. 11 illustrates a PUCCH resource comprising non-consecutive PRBs in frequency domain according to an embodiment of the present disclosure. In some examples, the PUCCH resource contains non-consecutive PRBs in frequency domain. In this case, the set of parameters should additionally include the number of interval PRB. Optionally, L and M can be separately configured from table 3 or L and M can be separately pre-defined in the PUCCH resource configuration. In some embodiments, L and M are a positive integer and are greater than or equal to 1. For example, L and M are equal to 1, 2, or 4. When these parameters are separately indicated, this making the use of parameters flexible. When these parameters are indicated together, signal overhead can be reduced.

TABLE 3

PUCCH resource sets

| Index | PUCCH format | First symbol | Number of symbols | PRB offset $RB_{BWP}^{offset}$ | Number of PRB (L) | Interval PRB (M) | Set of initial CS indexes |
|---|---|---|---|---|---|---|---|
| 0 | 0 | 12 | 2 | 0 | Positive integer | Positive integer | {0, 3} |
| 1 | 0 | 12 | 2 | 0 | Positive integer | Positive integer | {0, 4, 8} |
| 2 | 0 | 12 | 2 | 3 | Positive integer | Positive integer | {0, 4, 8} |
| 3 | 1 | 10 | 4 | 0 | Positive integer | Positive integer | {0, 6} |
| 4 | 1 | 10 | 4 | 0 | Positive integer | Positive integer | {0, 3, 6, 9} |
| 5 | 1 | 10 | 4 | 2 | Positive integer | Positive integer | {0, 3, 6, 9} |
| 6 | 1 | 10 | 4 | 4 | Positive integer | Positive integer | {0, 3, 6, 9} |
| 7 | 1 | 4 | 10 | 0 | Positive integer | Positive integer | {0, 6} |
| 8 | 1 | 4 | 10 | 0 | Positive integer | Positive integer | {0, 3, 6, 9} |
| 9 | 1 | 4 | 10 | 2 | Positive integer | Positive integer | {0, 3, 6, 9} |
| 10 | 1 | 4 | 10 | 4 | Positive integer | Positive integer | {0, 3, 6, 9} |
| 11 | 1 | 0 | 14 | 0 | Positive integer | Positive integer | {0, 6} |
| 12 | 1 | 0 | 14 | 0 | Positive integer | Positive integer | {0, 3, 6, 9} |
| 13 | 1 | 0 | 14 | 2 | Positive integer | Positive integer | {0, 3, 6, 9} |

TABLE 3-continued

| | | | | | | | Set of |
|---|---|---|---|---|---|---|---|
| | PUCCH | First | Number of | PRB offset | Number of | Interval | initial CS |
| Index | format | symbol | symbols | $RB_{BWP}^{offset}$ | PRB (L) | PRB (M) | indexes |
| 14 | 1 | 0 | 14 | 4 | Positive integer | Positive integer | {0, 3, 6, 9} |
| 15 | 1 | 0 | 14 | $\lfloor N_{BWP}^{size}/4 \rfloor$ | Positive integer | Positive integer | {0, 3, 6, 9} |

In some embodiments, for non-consecutive PRBs in the frequency domain, the PUCCH starting PRB index for PUCCH resource in the frequency domain is determined by at least one of the following: the PRB offset, the number of PRBs for PUCCH, the PUCCH resource index ($r_{PUCCH}$), and $N_{CS}$, wherein $N_{CS}$ is the number of initial cyclic shift indexes in the set of initial cyclic shift indexes. In some embodiments, for non-consecutive PRBs in the frequency domain, the PUCCH starting PRB index for PUCCH resource in the frequency domain is determined by PRB offset+L+(L−1)*M*$\lfloor r_{PUCCH}/N_{CS} \rfloor$, where $r_{PUCCH}$ is the PUCCH resource index, $N_{CS}$ is the total number of initial cyclic shift indexes in the set of initial cyclic shift indexes, L is the number of PRBs for PUCCH, and M is the PRB interval. In some embodiments, a PUCCH resource determination follows a frequency hopping allocating the PUCCH resource backwards from an ending PRB of a bandwidth part (BWP). In some embodiments, for consecutive PRBs in the frequency domain, a last PRB index of the PUCCH resource is determined by N−1−PRB offset−L+(L−1)*M*$\lfloor r_{PUCCH}/N_{CS} \rfloor$, where N−1 is the last PRB index of the BWP, $r_{PUCCH}$ is the PUCCH resource index, $N_{CS}$ is the total number of initial cyclic shift indexes in the set of initial cyclic shift indexes, L is the number of PRBs for PUCCH, and M is the PRB interval. In some embodiments, a first PUCCH index and a second PUCCH index respectively correspond to a first PUCCH resource and a second PUCCH resource.

In some embodiments, a first PRB index of the first PUCCH resource and a second PRB index of the second PUCCH resource are not overlapped in the frequency domain. In some embodiments, the first PRB index of the first PUCCH resource and the second PRB index of the second PUCCH resource are adjacent in the frequency domain. In some embodiments, the second PRB index is a first PRB, and the first PRB index is a last PRB. In some embodiments, the second PUCCH index is equal to first PUCCH index plus $N_{CS}$, where $N_{CS}$ is the total number of initial cyclic shift indexes in the set of initial cyclic shift indexes.

In some examples, for RRC connected UEs, the gNB can directly configure the PUCCH resource in the RRC message. The configuration of starting PRB and/or number of PRB (L) and/or PRB interval (M) can be configured in PUCCH-Resource IE.

Example: PUCCH-Resource IE

```
PUCCH-Resource ::= SEQUENCE {
pucch-ResourceId PUCCH-ResourceId,
startingPRB PRB-Id,
intraSlotFrequencyHopping ENUMERATED { enabled } OPTIONAL, -- Need R
secondHopPRB PRB-Id OPTIONAL, -- Need R
format CHOICE {
format0 PUCCH-format0,
format1 PUCCH-format1,
format2 PUCCH-format2,
format3 PUCCH-format3,
format4 PUCCH-format4 }
}
    PUCCH-ResourceId ::= INTEGER (0..maxNrofPUCCH-Resources-1)
PUCCH-format0 ::= SEQUENCE {
Number of PRB
PRB interval
initialCyclicShift INTEGER(0..11),
nrofSymbols INTEGER (1..2),
startingSymbolIndex INTEGER(0..13) }
```

FIG. 12 is a schematic diagram illustrating a sub-PRB allocation according to an embodiment of the present disclosure. In some examples, the PUCCH resource allocation is not based on a full PRB-based allocation. Instead, only partial PRB (or sub-PRB) is allocated for PUCCH. One PRB contains 12 REs, so a partial PRB or sub-PRB may contain one or more REs and a sub-PRB is allocated for PUCCH instead of a PRB. For a sub-PRB, it includes a number of REs smaller than 12. Optionally, the number of REs in a sub-PRB is divisible by 12, e.g. 1, 2, 3, 4, 6. In FIG. 12, we have some examples for 1 sub-PRB=1 REs, 1 sub-PRB=3 REs, and 1 sub-PRB=6 REs, respectively.

FIG. 12 illustrates that, in some embodiments, in some examples, for a UE to determine the PUCCH resource, the UE may first determine the one or more PRBs in which the PUCCH resource is allocated. Then, the UE may further determine a sub-PRB within in the one or more PRBs that are allocated for PUCCH resource. In some examples, the number of the REs in a sub-PRB, and/or the sub-PRB location within a PRB can be pre-configured or pre-defined. In some examples, there is an interval between two allocated sub-PRBs as illustrated in FIG. 12. The interval can be denoted by M in FIG. 12 and the value of M can also be pre-configured or pre-defined. In some examples, M is a number of sub-PRBs. The value of M is calculated by $A*2^n$, where $A=12/B$ and B is the number of the REs in a sub-PRB; and n is an integer, e.g. n=0, 1, 2, and so on. The interval M means between two allocated sub-PRB, there are M empty sub-PRBs therebetween that are not allocated for PUCCH resource.

The present example embodiment is applicable to NR in unlicensed spectrum (NR-U). The present disclosure can be applied to other mobile networks, in particular to mobile network of any further generation cellular network technology (6G, etc.).

Commercial interests for some embodiments are as follows. 1. Solving issues in the prior art. 2. Providing a method to boost a transmission power of PUCCH. 3. Providing a good communication performance. 4. Providing a high reliability. 5. Some embodiments of the present disclosure are used by 5G-NR chipset vendors, V2X communication system development vendors, automakers including cars, trains, trucks, buses, bicycles, moto-bikes, helmets, and etc., drones (unmanned aerial vehicles), smartphone makers, communication devices for public safety use, AR/VR device maker for example gaming, conference/seminar, education purposes. The deployment scenarios include, but not limited to, indoor hotspot, dense urban, urban micro, urban macro, rural, factor hall, and indoor D2D scenarios. Some embodiments of the present disclosure are a combination of "techniques/processes" that can be adopted in 3GPP specification to create an end product. Some embodiments of the present disclosure could be adopted in 5G NR licensed and non-licensed or shared spectrum communications. Some embodiments of the present disclosure propose technical mechanisms.

Figure 13:
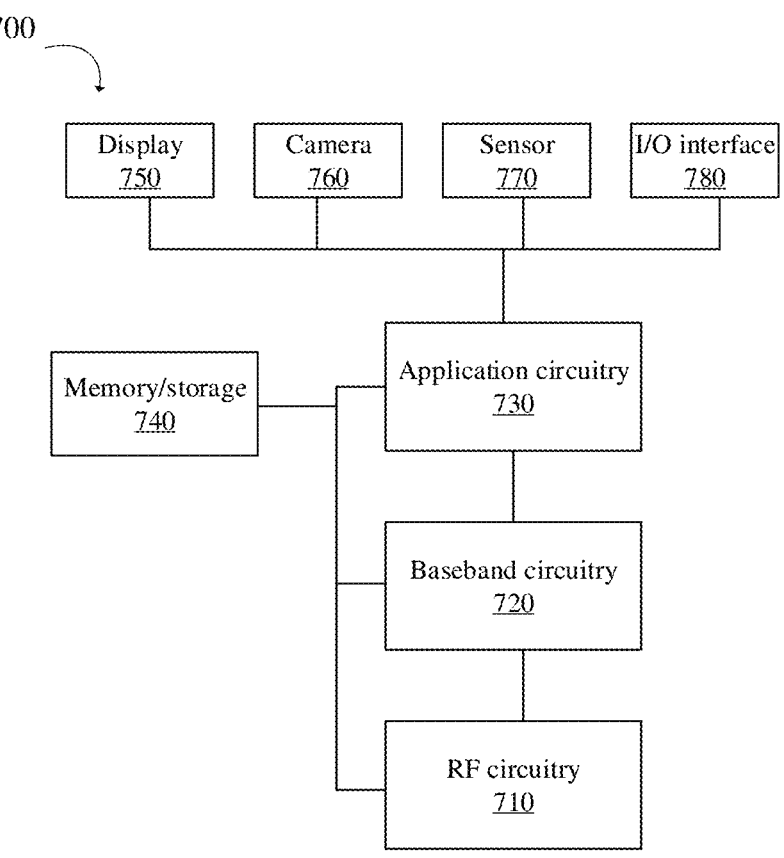
FIG. 13 is a block diagram of a system for wireless communication according to an embodiment of the present disclosure.

FIG. 13 is a block diagram of an example system 700 for wireless communication according to an embodiment of the present disclosure. Embodiments described herein may be implemented into the system using any suitably configured hardware and/or software. FIG. 13 illustrates the system 700 including a radio frequency (RF) circuitry 710, a baseband circuitry 720, an application circuitry 730, a memory/storage 740, a display 750, a camera 760, a sensor 770, and an input/output (I/O) interface 780, coupled with each other at least as illustrated. The application circuitry 730 may include a circuitry such as, but not limited to, one or more single-core or multi-core processors. The processors may include any combination of general-purpose processors and dedicated processors, such as graphics processors, application processors. The processors may be coupled with the memory/storage and configured to execute instructions stored in the memory/storage to enable various applications and/or operating systems running on the system.

The baseband circuitry 720 may include circuitry such as, but not limited to, one or more single-core or multi-core processors. The processors may include a baseband processor. The baseband circuitry may handle various radio control functions that enables communication with one or more radio networks via the RF circuitry. The radio control functions may include, but are not limited to, signal modulation, encoding, decoding, radio frequency shifting, etc. In some embodiments, the baseband circuitry may provide for communication compatible with one or more radio technologies. For example, in some embodiments, the baseband circuitry may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry is configured to support radio communications of more than one wireless protocol may be referred to as multi-mode baseband circuitry.

In various embodiments, the baseband circuitry 720 may include circuitry to operate with signals that are not strictly considered as being in a baseband frequency. For example, in some embodiments, baseband circuitry may include circuitry to operate with signals having an intermediate frequency, which is between a baseband frequency and a radio frequency. The RF circuitry 710 may enable communication with wireless networks using modulated electromagnetic radiation through a non-solid medium. In various embodiments, the RF circuitry may include switches, filters, amplifiers, etc. to facilitate the communication with the wireless network. In various embodiments, the RF circuitry 710 may include circuitry to operate with signals that are not strictly considered as being in a radio frequency. For example, in some embodiments, RF circuitry may include circuitry to operate with signals having an intermediate frequency, which is between a baseband frequency and a radio frequency.

In various embodiments, the transmitter circuitry, control circuitry, or receiver circuitry discussed above with respect to the user equipment, eNB, or gNB may be embodied in whole or in part in one or more of the RF circuitry, the baseband circuitry, and/or the application circuitry. As used herein, "circuitry" may refer to, be part of, or include an Application Specific Integrated Circuit (ASIC), an electronic circuit, a processor (shared, dedicated, or group), and/or a memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules. In some embodiments, some or all of the constituent components of the baseband circuitry, the application circuitry, and/or the memory/storage may be implemented together on a system on a chip (SOC). The memory/storage 740 may be used to load and store data and/or instructions, for example, for system. The memory/storage for one embodiment may include any combination of suitable volatile memory, such as dynamic random access memory (DRAM)), and/or non-volatile memory, such as flash memory.

In various embodiments, the I/O interface 780 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface. In various embodiments, the sensor 770 may include one or more sensing devices to determine environmental conditions and/or location information related to the system. In some embodiments, the sensors may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network, e.g., a global positioning system (GPS) satellite.

In various embodiments, the display 750 may include a display, such as a liquid crystal display and a touch screen display. In various embodiments, the system 700 may be a mobile computing device such as, but not limited to, a laptop computing device, a tablet computing device, a netbook, an ultrabook, a smartphone, an AR/VR glasses, etc. In various embodiments, system may have more or less components, and/or different architectures. Where appropriate, methods described herein may be implemented as a computer program. The computer program may be stored on a storage medium, such as a non-transitory storage medium.

A person having ordinary skill in the art understands that each of the units, algorithm, and steps described and disclosed in the embodiments of the present disclosure are realized using electronic hardware or combinations of software for computers and electronic hardware. Whether the functions run in hardware or software depends on the condition of application and design requirement for a technical plan. A person having ordinary skill in the art can use different ways to realize the function for each specific application while such realizations should not go beyond the scope of the present disclosure. It is understood by a person having ordinary skill in the art that he/she can refer to the working processes of the system, device, and unit in the above-mentioned embodiment since the working processes of the above-mentioned system, device, and unit are basically the same. For easy description and simplicity, these working processes will not be detailed.

It is understood that the disclosed system, device, and method in the embodiments of the present disclosure can be realized with other ways. The above-mentioned embodiments are exemplary only. The division of the units is merely based on logical functions while other divisions exist in realization. It is possible that a plurality of units or components are combined or integrated in another system. It is also possible that some characteristics are omitted or skipped. On the other hand, the displayed or discussed mutual coupling, direct coupling, or communicative coupling operate through some ports, devices, or units whether indirectly or communicatively by ways of electrical, mechanical, or other kinds of forms.

The units as separating components for explanation are or are not physically separated. The units for display are or are not physical units, that is, located in one place or distributed on a plurality of network units. Some or all of the units are used according to the purposes of the embodiments. More-over, each of the functional units in each of the embodiments can be integrated in one processing unit, physically independent, or integrated in one processing unit with two or more than two units.

If the software function unit is realized and used and sold as a product, it can be stored in a readable storage medium in a computer. Based on this understanding, the technical plan proposed by the present disclosure can be essentially or partially realized as the form of a software product. Or, one part of the technical plan beneficial to the conventional technology can be realized as the form of a software product. The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program codes.

While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims.

What is claimed is:

1. A wireless communication method, by a user equipment (UE), comprising:

determining, by the UE from a base station, a configuration of a physical uplink control channel (PUCCH) resource, wherein the PUCCH resource in frequency domain comprises one or more physical resource blocks (PRBs) and corresponds to a PUCCH format 0, a PUCCH format 1, or a PUCCH format 4;

wherein a PUCCH resource determination follows a frequency hopping allocating the PUCCH resource backwards from an ending PRB of a bandwidth part (BWP).

2. The method of claim 1, wherein the PRBs are consecutive in the frequency domain, and the configuration of the PUCCH resource comprises a starting RB and/or a number of RBs used as an RB length.

3. The method of claim 1, wherein the configuration of the PUCCH resource comprises at least one of the followings: a PUCCH starting PRB index, a number of PRBs for PUCCH (L), or a PUCCH format, and wherein the PUCCH starting PRB index, the number of PRBs for PUCCH, and the PUCCH format are pre-defined in a configuration table.

4. The method of claim 3, wherein a PUCCH resource in frequency domain comprises L consecutive PRBs starting from the PUCCH starting PRB index, and a first PUCCH resource corresponding to a first PUCCH resource index is not overlapped in frequency domain with a second PUCCH resource corresponding to a second PUCCH resource index; and wherein the first PUCCH resource and the second PUCCH resource are adjacent in frequency domain, where the second PUCCH resource index is equal to the first PUCCH resource index plus Ncs, wherein the Ncs is the number of the cyclic shift indexes in the set of initial cyclic shift indexes.

5. The method of claim 3, wherein for consecutive PRBs in the frequency domain, the PUCCH starting PRB index for PUCCH resource in the frequency domain is determined by at least one of the following: the PRB offset, the number of PRBs for PUCCH, the PUCCH resource index ($r_{PUCCH}$), and $N_{CS}$, wherein $N_{CS}$ is the number of initial cyclic shift indexes in the set of initial cyclic shift indexes.

6. The method of claim 1, wherein the PRBs are non-consecutive in the frequency domain, and for non-consecutive PRBs in the frequency domain, the configuration of the PUCCH resource comprises a starting RB, a number of RBs used as an RB length, and an RB interval between two RBs.

7. The method of claim 6, wherein the configuration of the PUCCH resource comprises at least one of the followings: a PUCCH starting PRB index, a number of PRBs for PUCCH, a PUCCH format, or a PRB interval.

8. The method of claim 7, wherein for non-consecutive PRBs in the frequency domain, the PUCCH starting PRB index for PUCCH resource in the frequency domain is determined by at least one of the following: the PRB offset, the number of PRBs for PUCCH, the PUCCH resource index ($r_{PUCCH}$), and $N_{CS}$, wherein $N_{CS}$ is the number of initial cyclic shift indexes in the set of initial cyclic shift indexes.

9. A wireless communication method by a base station, comprising:
configuring, by the base station to a user equipment (UE), a configuration of a physical uplink control channel (PUCCH) resource, wherein the PUCCH resource in frequency domain comprises one or more physical resource blocks (PRBs) and corresponds to a PUCCH format 0, a PUCCH format 1, or a PUCCH format 4;
wherein a PUCCH resource determination follows a frequency hopping allocating the PUCCH resource backwards from an ending PRB of a bandwidth part (BWP).

10. The method of claim 9, wherein the PRBs are consecutive in the frequency domain, and the configuration of the PUCCH resource comprises a starting RB and/or a number of RBs used as an RB length.

11. The method of claim 9, wherein the configuration of the PUCCH resource comprises at least one of the followings: a PUCCH starting PRB index, a number of PRBs for PUCCH (L), or a PUCCH format, and wherein the PUCCH starting PRB index, the number of PRBs for PUCCH, and the PUCCH format are pre-defined in a configuration table.

12. The method of claim 9, wherein the base station is configured to transmit the configuration of the PUCCH resource in system information.

13. The method of claim 11, wherein a PUCCH resource in frequency domain comprises L consecutive PRBs starting from the PUCCH starting PRB index, and a first PUCCH resource corresponding to a first PUCCH resource index is not overlapped in frequency domain with a second PUCCH resource corresponding to a second PUCCH resource index; and
wherein the first PUCCH resource and the second PUCCH resource are adjacent in frequency domain, where the second PUCCH resource index is equal to the first PUCCH resource index plus Ncs, wherein the Nes is the number of the cyclic shift indexes in the set of initial cyclic shift indexes.

14. The method of claim 11, wherein for consecutive PRBs in the frequency domain, the PUCCH starting PRB index for PUCCH resource in the frequency domain is determined by at least one of the following: the PRB offset, the number of PRBs for PUCCH, the PUCCH resource index ($r_{PUCCH}$), and $N_{CS}$, wherein $N_{CS}$ is the number of initial cyclic shift indexes in the set of initial cyclic shift indexes.

15. The method of claim 9, wherein the PRBs are non-consecutive in the frequency domain, and for non-consecutive PRBs in the frequency domain, the configuration of the PUCCH resource comprises a starting RB, a number of RBs used as an RB length, and an RB interval between two RBs.

16. The method of claim 15, wherein the configuration of the PUCCH resource comprises at least one of the followings: a PUCCH starting PRB index, a number of PRBs for PUCCH, a PUCCH format, or a PRB interval, and wherein the PUCCH starting PRB index, the number of PRBs for PUCCH, the PRB interval, and the PUCCH format are pre-defined in a configuration table.

17. The method of claim 16, wherein for non-consecutive PRBs in the frequency domain, the PUCCH starting PRB index for PUCCH resource in the frequency domain is determined by at least one of the following: the PRB offset, the number of PRBs for PUCCH, the PUCCH resource index ($r_{PUCCH}$), and $N_{CS}$, wherein $N_{CS}$ is the number of initial cyclic shift indexes in the set of initial cyclic shift indexes.

18. A user equipment (UE), comprising:
a memory;
a transceiver; and
a processor coupled to the memory and the transceiver;
wherein the processor is configured to determine from a base station, a configuration of a physical uplink control channel (PUCCH) resource, wherein the PUCCH resource in frequency domain comprises one or more physical resource blocks (PRBs) and corresponds to a PUCCH format 0, a PUCCH format 1, or a PUCCH format 4;
wherein a PUCCH resource determination follows a frequency hopping allocating the PUCCH resource backwards from an ending PRB of a bandwidth part (BWP).

19. A base station, comprising:
a memory;
a transceiver; and
a processor coupled to the memory and the transceiver;
wherein the processor is configured to configure to a user equipment (UE), a configuration of a physical uplink control channel (PUCCH) resource, wherein the PUCCH resource in frequency domain comprises one or more physical resource blocks (PRBs) and corresponds to a PUCCH format 0, a PUCCH format 1, or a PUCCH format 4;
wherein a PUCCH resource determination follows a frequency hopping allocating the PUCCH resource backwards from an ending PRB of a bandwidth part (BWP).

* * * * *